US007489828B2

(12) United States Patent
Asad et al.

(10) Patent No.: US 7,489,828 B2
(45) Date of Patent: Feb. 10, 2009

(54) METHODS, SYSTEM, AND PROGRAM PRODUCT FOR THE DETECTION AND CORRECTION OF SPHERICAL ABERRATION

(75) Inventors: Abu-Tarif Asad, Troy, NY (US); Timothy J. Holmes, East Greenbush, NY (US)

(73) Assignee: Media Cybernetics, Inc., Bethesda, MD (US)

( * ) Notice: Subject to any disclaimer, the term of this patent is extended or adjusted under 35 U.S.C. 154(b) by 697 days.

(21) Appl. No.: 10/955,650

(22) Filed: Sep. 30, 2004

(65) Prior Publication Data

US 2005/0083517 A1 Apr. 21, 2005

Related U.S. Application Data

(60) Provisional application No. 60/508,735, filed on Oct. 3, 2003.

(51) Int. Cl.
*G06K 9/40* (2006.01)
*G06K 9/64* (2006.01)
*G01B 9/00* (2006.01)

(52) U.S. Cl. .................... 382/254; 382/255; 382/279; 356/124

(58) Field of Classification Search ................ 382/254; 356/124
See application file for complete search history.

(56) References Cited

U.S. PATENT DOCUMENTS

| 6,166,853 | A * | 12/2000 | Sapia et al. | 359/559 |
| 6,418,243 | B1 * | 7/2002 | Skoglund et al. | 382/274 |
| 6,440,620 | B1 * | 8/2002 | Katsap et al. | 430/30 |
| 6,607,274 | B2 * | 8/2003 | Stantz et al. | 351/221 |
| 7,091,990 | B2 * | 8/2006 | Ganser et al. | 345/619 |

OTHER PUBLICATIONS

Primot et al., "Deconvolution from wave-front sensing: a new technique for compensating turbulence-degraded images", Journal Optical Society of America A, vol. 7, No. 9, Sep. 1990, pp. 1598-1608.*

(Continued)

*Primary Examiner*—Jingge Wu
*Assistant Examiner*—Jose M Torres
(74) *Attorney, Agent, or Firm*—Caesar, Rivise, Bernstein, Cohen & Pokotilow, Ltd.

(57) ABSTRACT

The present invention provides methods, a system, and a program product for the rapid detection and correction of spherical aberration in microscopy systems. More specifically, the present invention empirically derives a pupil function, adaptively corrects PSF parameters, and automatically detects the coefficient for spherical aberration. A first aspect of the invention provides a method for detecting and estimating spherical aberration in an acquired image obtained using an optical system, comprising the steps of deconvolving an image using each of a plurality of point spread functions, wherein each point spread function has a different spherical aberration value, calculating an image energy for each deconvolved image, and choosing as a spherical aberration coefficient the spherical aberration value corresponding to the deconvolved image having the lowest image energy, wherein a spherical aberration coefficient other than 0 indicates the presence of spherical aberration in the acquired image and its distance from 0 is an estimation of the degree and direction of spherical aberration.

20 Claims, 6 Drawing Sheets

OTHER PUBLICATIONS

Kabius, B. et al., "First Application of a Spherical-Aberration Corrected Transmission Electron Microscope in Materials Science," Journal of Electron Microscopy, vol. 51, Supplement, 2002, pp. S51-S58.

O'Connor, N. J. et al., "Fluorescent Infrared Scanning-Laser Ophthalmoscope for Three-Dimensional Visualization: Automatic Random-Eye-Motion Correction and Deconvolution," Applied Optics, vol. 37, No. 11, Apr. 10, 1998, pp. 2021-2033.

Holmes, T. J., "Maximum-Likelihood Image Restoration Adapted for Noncoherent Optical Imaging," Journal of the Optical Society of America A, vol. 5, No. 5, May 1988, pp. 666-673.

Gibson, S. F. et al., "Diffraction by a Circular Aperture as a Model for Three-Dimensional Optical Microscopy," Journal of the Optical Society of America A, vol. 6, No. 9, Sep. 1989, pp. 1357-1367.

Holmes, T. J. et. al., "Acceleration of Maximum-Likelihood Image Restoration for Fluorescence Microscopy and Other Noncoherent Imagery," Journal of the Optical Society of America A, vol. 8, No. 6, Jun. 1991, pp. 893-907.

Dellby, N. et al., "Progress in Aberration-Corrected Scanning Transmission Electron Microscopy," Journal of Electron Microscopy, vol. 50, No. 3, 2001, pp. 177-185.

Krivanek, O.L. et al., "Towards sub-Å Electron Beams," Ultramicroscopy, vol. 78, pp. 1-11, 1999.

Markham, J. et al., "Parametric Blind Deconvolution: A Robust Method for the Simultaneous Estimation of Image and Blur," J. Opt. Soc. Am. A., vol. 16, No. 10, Oct. 1999, pp. 2377-2391.

Holmes, T. J., "Blind Deconvolution of Quantum-Limited Incoherent Imagery: Maximum-Likelihood Approach," Journal of the Optical Society of America A, vol. 9, No. 7, Jul. 1992, pp. 1052-1061.

Hopkins, H. H., "The Frequency Response of a Defocused Optical System," Proc. R. Soc. A., 1955, pp. 91-103.

Holmes, T. J., "Expectation-Maximization Restoration of Band-Limited, Truncated Point-Process Intensities with Application in Microscopy," Journal of the Optical Society of America A, 1989, pp. 1006-1014.

* cited by examiner (a) (b) (c)

(a)

(b)

METHODS, SYSTEM, AND PROGRAM PRODUCT FOR THE DETECTION AND CORRECTION OF SPHERICAL ABERRATION

CROSS REFERENCE TO RELATED APPLICATIONS

The current application claims the benefit of co-pending U.S. Provisional Application No. 60/508,735, filed Oct. 3, 2003, which is hereby incorporated herein by reference.

BACKGROUND OF THE INVENTION (1) Technical Field

The present invention relates generally to optical systems and more specifically to methods, systems, and program products for the detection and correction of spherical aberration in microscopy systems.

(2) Related Art

Spherical aberration is a common problem in microscopy systems. It is the result of differences in the focal points of light rays based on their differing distances from the center of a lens, i.e., the optic axis of the lens. In the apparatus 100 shown in FIG. 1, light rays 120 passing through a lens 110 at points further from its center have a focal point 130 closer to lens 110 than the focal point 132 formed by light rays 122 entering lens 110 at points closer to its center. Often, this is caused, entirely or in part, by a difference in the refractive indices of the lens immersion medium and the embedding medium of the sample. While light rays entering the lens at points further from its center are shown as having focal points closer to the lens, such rays could also have focal points further from the lens than do rays entering the lens at points closer to its center. The effects of spherical aberration include reductions in both the resolving power of the lens and the signal-to-noise ratio in collected data. Spherical aberration increases as one focuses further into a sample.

Spherical aberration is more problematic in spherical lenses. Lenses having parabolic surfaces have been shown to reduce or eliminate the effect of spherical aberration, but are not often used, due to their great expense. Other methods for correcting spherical aberration exist, including, for example, the use of a correction collar on the lens, use of a lens immersion medium with a refractive index matching that of the embedding medium, and altering the thickness of the coverslip. The difficulty with such methods, aside from the additional time and expense they require, is that spherical aberration often is not detected until after image data have been collected. Accordingly, the correction of spherical aberration frequently occurs after data collection. Traditionally, such correction has relied on the use of deconvolution algorithms, which enable manipulation of an acquired image to recover a more accurate representation of the imaged object. Such algorithms generally follow the equation:

$$\mu_n(x,y,z) = \chi_n(x,y,z) * h(x,y,z) + b(x,y,z) + N(x,y,z) \quad \text{(Eq. 1)}$$

where $\mu_n(x,y,z)$=acquired image;
$\chi_n(x,y,z)$=imaged object;
h(x,y,z)=point spread function (PSF);
b(x,y,z)=background level (primarily due to dark current);
N(x,y,z)=random noise;
*=convolution operator;
x,y=in-plane spatial variables; and
z=axial spatial variable.

Background level can be measured through a calibration protocol described by Holmes et al. ("Light Microscopic Images Reconstructed by Maximum Likelihood Deconvolution" in HANDBOOK OF BIOLOGICAL CONFOCAL MICROSCOPY, 2d ed. (1995)) and random noise can be statistically modeled. Thus, use of a deconvolution algorithm essentially involves the recovery of an imaged object ($\chi_n$), given an acquired image ($\mu_n$) and a calculated PSF (h).

Deconvolution algorithms generally follow one of four schemes. The first, described by Hopkins (*The frequency response of a defocused optical system*, Proc. R. Soc. A., 91-103 (1955)), constructs a PSF based on diffraction theory, using a generated pupil function. The second, described by Holmes (*Maximum-likelihood image restoration adapted for noncoherent optical imaging*, J. Opt. Soc. Am, 6:1006-1014 (1989)), assumes a measured PSF. The third, also described by Holmes (*Blind deconvolution of quantum-limited incoherent imagery*, J. Opt. Soc. Am., 9:1052-1061 (1992)), concurrently estimates the PSF and the imaged object with blind deconvolution. The fourth, described by Markham and Conchello (*Parametric blind deconvolution: a robust method for the simultaneous estimation of image and blur*, J. Opt. Soc. Am. 16: 2377-2391 (1999)), uses parametric blind deconvolution.

FIG. 2 shows the XZ plane of a PSF 200, wherein the acquired image of an imaged object 240 is spread, in part, across two halves 250, 252 of an hourglass pattern. Angle 260 (α) determines the overall shape of the hourglass pattern.

Depending upon the particular degree and direction of the spherical aberration, a greater proportion of the acquired image may be located in one half of the hourglass pattern than the other. For example, as shown in FIG. 3, three generateded images are shown in panels (a), (b), and (c), having spherical aberration coefficients of −15, 0, and 15, respectively.

In diffraction theory, the pupil function is central to the generation of a PSF. In the frequency domain, the optical transfer function (OTF) is given by the pupil function convolved with its conjugate. The OTF (in the frequency domain) and the PSF (in the spatial domain), in turn, have a Fourier transform relationship. Therefore, using the properties of the Fourier transform, a PSF can be calculated as the complex multiplication of f(x,y,z) and f*(x,y,z), where f(x,y,z) and f*(x,y,z) are the inverse Fourier transform and its conjugate of the pupil function, respectively.

A pupil function can be found according to the following equation provided by Hopkins (1955), supra:

$$F(X,Y) = \begin{cases} e^{\{iknAz\rho^2\}} & \rho^2 \leq 1 \\ 0 & \rho^2 > 1 \end{cases} \quad \text{(Eq. 2)}$$

where $\rho^2 = x^2 + y^2$ k is the wave number, defined as $$k = \frac{2\pi}{\lambda};$$

λ is the emission wavelength, typically between 350 and 1000 nm for optical sectioning;
z is the distance from the in-focus to the out-of-focus plane; and
A is a coefficient derived from a refraction index (n) and numerical aperture (NA).

The hourglass angle, α, of the PSF is determined by the size of the aperture (assumed to be circular) of the optical system and the distance between the optical system and the imaged object. This angle can be calculated according to the equation:

$$\sin\alpha = \frac{NA}{n} \quad \text{(Eq. 3)}$$

where NA is the numerical aperture of the optical system; and
n is the refraction index.

In theory, the hourglass angle calculated by equation 3 is the same as the hourglass angle of the PSF calculated using equation 2. Often, however, this is not so. Equation 3 has been used, therefore, to validate the accuracy of the PSF calculated using equation 2.

In addition, in order for the pupil function calculated using equation 2 to be correct, two conditions must be met. First, X and Y must be normalized so that the circular pupil resides exactly within a unit circle. The normalization factor should be the bandwidth of the pupil function, given by the equation:

$$B_{pupil} = \frac{NA}{\lambda} \quad \text{(Eq. 4)}$$

where NA is the numerical aperture; and
λ is the emission wavelength.

Second, the sampling density (Δx and Δy) in the spatial domain must satisfy the Nyquist criterion, i.e., max (Δx, Δy)≦(1/(2 $B_{pupil}$)). Because sampling density is determined by a user when acquiring data, the Nyquist criterion may not be satisfied. The effect of a sampling density not satisfying the Nyquist criterion is a PSF having a significantly smaller hourglass angle than it should.

A further difficulty in using equation 2 to calculate a PSF is that it assumes that PSFs are symmetric. Aberrations can cause a PSF to be asymmetric. Wilson ("The role of the pinhole in confocal imaging system" in HANDBOOK OF BIOLOGICAL CONFOCAL MICROSCOPY, 2d ed. (1995)) provides the following formula for calculating a pupil function useful in determining an asymmetric PSF:

$$F_{SA}(X,Y) = F(X,Y) \times e^{\{i2\pi \times SA \times \rho^4\}} \quad \text{(eq. 5)}$$

where $F_{SA}(X,Y)$ ≡ the pupil function for the spherically aberrated PSF;

F(x,y)≡ the symmetric pupil function calculated using Hopkins' formula above; and SA≡ the coefficient for spherical aberrations.

In practice, however, none of the schemes mentioned above has proved satisfactory in correcting spherical aberration. PSFs constructed according to diffraction theory are generally not accurate; measured PSFs are difficult to obtain and unreliable; PSFs estimated concurrently with an estimation of the imaged object do not follow accurate parametric modeling of the PSF; and parametric blind deconvolution is prohibitively slow and requires enormous computing power.

Accordingly, a need exists for methods, systems, and program products that quickly detect spherical aberration, provide accurate PSF values, and utilize a robust deconvolution algorithm that incorporates those PSF values.

SUMMARY OF THE INVENTION

The present invention provides a method, a system, and a program product for the rapid detection and correction of spherical aberration in microscopy systems. More specifically, the present invention automatically detects the coefficient for spherical aberration, empirically derives a pupil function, derives a PSF value from the pupil function, and utilizes a robust deconvolution algorithm that incorporates the derived PSF value.

A first aspect of the invention provides a method for detecting and estimating spherical aberration in an image obtained using an optical system, comprising the steps of deconvolving an acquired image using each of a plurality of point spread functions, wherein each point spread function has a different spherical aberration value, calculating an image energy for each deconvolved image, and choosing as a spherical aberration coefficient the spherical aberration value corresponding to the deconvolved image having the lowest image energy, wherein a spherical aberration coefficient other than 0 indicates the presence of spherical aberration in the acquired image and its difference from 0 is an estimation of the degree and direction of spherical aberration.

A second aspect of the invention provides a method for detecting and estimating spherical aberration in an image obtained using an optical system, comprising the steps of generating a plurality of spherically aberrated PSFs for an acquired image, wherein each PSF has a different spherical aberration value, calculating an XZ sum-of-intensities projection for each PSF, choosing an XZ and a YZ cross section of the image corresponding to a maximum XZ intensity, calculating a correlation coefficient using the PSF XZ projection and the XZ and YZ cross-sections for each PSF, and choosing as a spherical aberration coefficient the spherical aberration value associated with the PSF corresponding to the highest correlation coefficient, wherein a spherical aberration coefficient other than 0 indicates the presence of spherical aberration in the acquired image and its difference from 0 is an estimation of the degree and direction of spherical aberration.

A third aspect of the invention provides a method for empirically deriving a point spread function comprising the steps of defining a range of hourglass angles, calculating a pupil function for each hourglass angle using the equation $$F(X,Y) = \begin{cases} e^{\{i(knAz\rho^2 + 2\pi S\rho^4)\}} & \rho^2 \leq 1 \\ 0 & \rho^2 > 1 \end{cases},$$

where k is a wave number, n is a refraction index, z is a distance from an in-focus to an out-of-focus plane, S is a spherical aberration value, and A is a value that will yield the hourglass angle, fitting each value for A to a polynomial equation, and deriving a point spread function from the pupil function.

A fourth aspect of the invention provides a system for detecting and correcting spherical aberration in an image obtained using an optical system, comprising a system for detecting and estimating spherical aberration, a system for empirically deriving a pupil function, a system for deriving a point spread function from the pupil function, and a system for deconvolving an imaged object from an acquired image.

A fifth aspect of the invention provides a program product stored on a recordable medium for detecting and correcting spherical aberration in an image obtained using an optical system, which when executed, comprises at least one of a program code for detecting and estimating spherical aberration, a program code for empirically deriving a pupil function, a program code for deriving a point spread function from the pupil function, and a program code for deconvolving an imaged object from an acquired image.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

A. Spherical Aberration Detection

As noted above, users of microscopy systems are often unaware of the presence of spherical aberration during the collection of image data and may sometimes remain unaware that the data are so affected. Accordingly, one objective of the present invention is the detection of spherical aberration in image data.

Two novel methods for detecting spherical aberration are provided. The first is a correlation-based method. The second is an energy minimization method.

1. Correlation Method

The correlation-based method is predicated on the fact that if a spherically aberrated point spread function (PSF) is generated correctly and approximately the same as the true PSF, then similar structures are likely to be observed both in the spherically aberrated image data and in the reconstructed PSF. Therefore, the correlation-based method of the present invention first requires the generation of a plurality of spherically aberrated PSFs, each employing a different spherical aberration value, and the calculation of their XZ sum-of-intensities projections. Then, XZ and YZ cross sections of the data are chosen which correspond to maximum intensities in the data. A correlation coefficient is then calculated between the PSF XZ projections and the XZ and YZ cross-sections of the data. The spherical aberration value associated with the PSF corresponding to the highest correlation coefficient is chosen as the spherical aberration coefficient.

The correlation coefficient can be expressed as:

$$C = \frac{\sum_{i=1}^{N}(u_i - \bar{u})(v_i - \bar{v})}{\sqrt{\left(\sum_{i=1}^{N}(u_i - \bar{u})^2\right)\left(\sum_{i=1}^{N}(v_i - \bar{v})^2\right)}} \quad \text{(Eq. 6)}$$

where $u=\{u_i | i=1,2,\ldots N\}$ are the PSF XZ projections and $v=\{v_i | i=1,2,\ldots N\}$ are either the XZ data cross-sections or the YZ data cross-sections.

Figure 4:
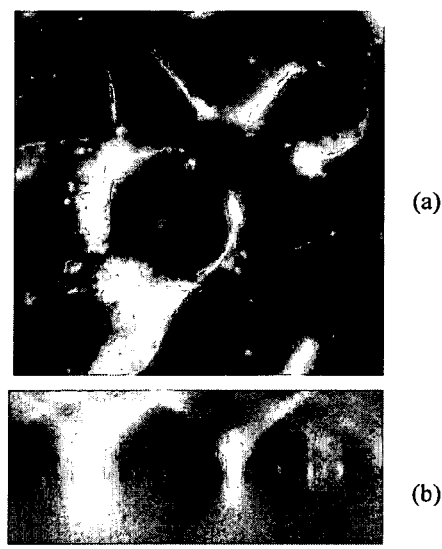
FIG. 4 shows the XY and XZ maximum intensity projections of a spherically aberrated image in panels (a) and (b), respectively.

For example, using the acquired image of FIG. 4, wherein panel (a) shows the XY maximum intensity projection and panel (b) shows the XZ maximum intensity projection, the correlation-based method of spherical aberration detection was carried out. The results are shown in the graph of FIG. 5, wherein the maximum correlation coefficient corresponds to a spherical aberration coefficient of approximately 4.9.

Figure 5:
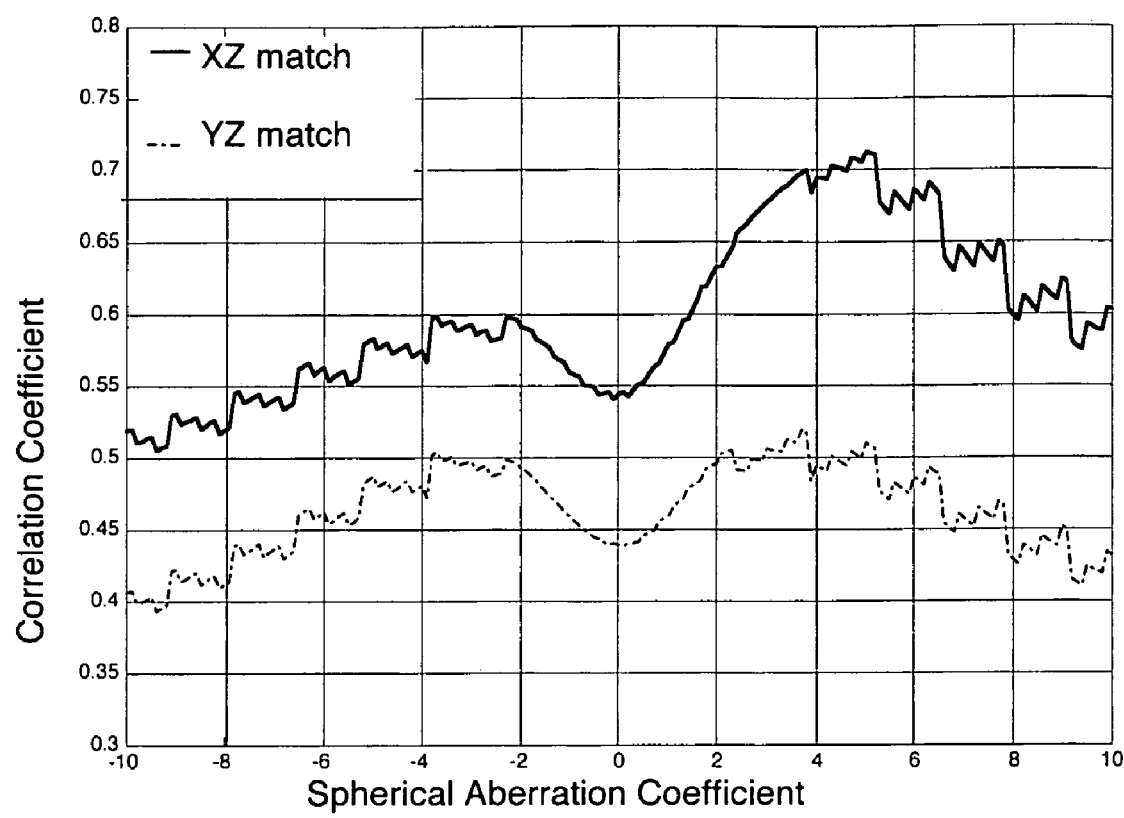
FIG. 5 shows a graph of correlation coefficient as a function of the spherical aberration coefficient for a correlation-based detection of spherical aberration in the image of FIG. 4.
Figure 6:
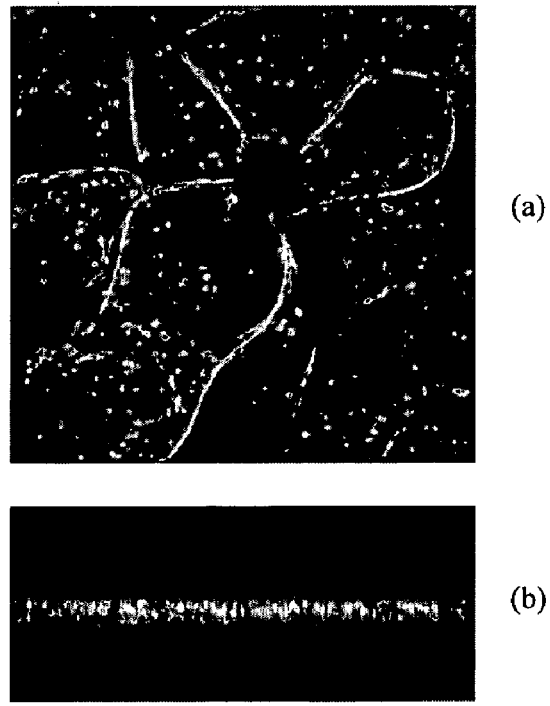
FIG. 6 shows a deconvolved image of the image in FIG. 4 using a correlation-based method of spherical aberration detection.

FIG. 6 shows the image resulting from the deconvolution of the image of FIG. 5 using a Weiner filter following the correlation-based method of spherical aberration detection. The improvement in image quality in both the XY (panel (a)) and XZ (panel (b)) planes is clear when compared to the uncorrected image of FIG. 4.

While these results demonstrate that the correlation-based method of spherical aberration detection offers significant improvements in image quality, it was found that the correlation-based method was not as reliable when an acquired image contained small or very large spherical aberrations. Accordingly, a more sensitive method for detecting spherical aberration is desirable in at least some circumstances.

2. Energy Minimization Method

The energy minimization method of spherical aberration detection is based upon the indirect measurement of spherical aberration using a measurable characteristic having a correlation to spherical aberration. Interestingly, it was found that the image energy of a spherically aberrated PSF (whether having positive or negative value) is higher than that of a non-spherically aberrated PSF. For example, referring again to FIG. 3, it is easy to see that the image intensities of the non-spherically aberrated PSF in panel (b) are much smoother than in either the negatively spherically aberrated PSF in panel (a) or the positively spherically aberrated PSF in panel (c). Therefore, if the sum of intensities is fixed, the image energy (defined as the sum of intensity squares) will be higher for spherically aberrated PSFs than for a non-spherically aberrated PSF.

Figure 1:
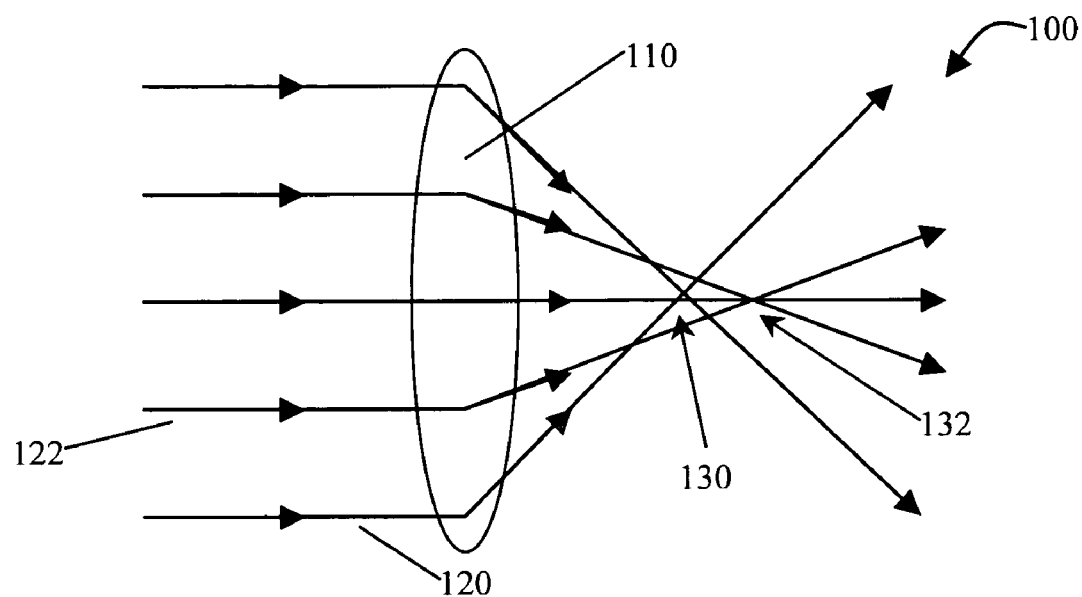
FIG. 1 shows the differing focal points resulting from the entry of light rays at differing distances from a lens' center.
Figure 2:
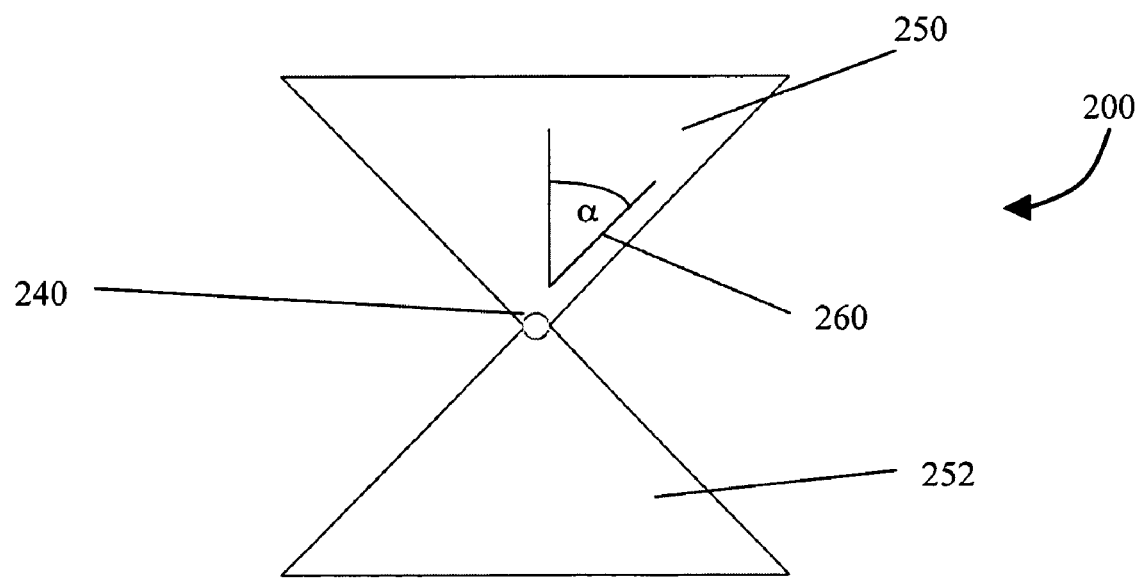
FIG. 2 shows the XZ plane of a point spread function (PSF) having an hourglass shape and angle α.
Figure 3:
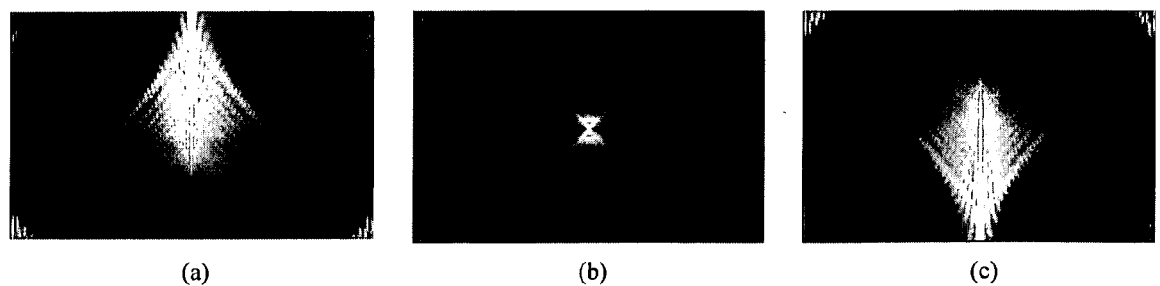
FIG. 3 shows the XZ planes of three images with spherical aberration coefficients of −15, 0, and 15 in panels (a), (b), and (c), respectively.

For example, if we assume that the sum of intensities for each of the PSFs in FIG. 3 is 10, the energy of the image in panel (b) will be the lowest because it exhibits less variation in image intensity than either of the images in panels (a) and (c). The sum of intensity squares might be, for example, $(2^2+2^2+3^2+3^2=26)$ for the panel (b) image while the sum of intensity squares for the panel (a) image is $(4^2+4^2+1^2+1^2=34)$.

Figure 7:
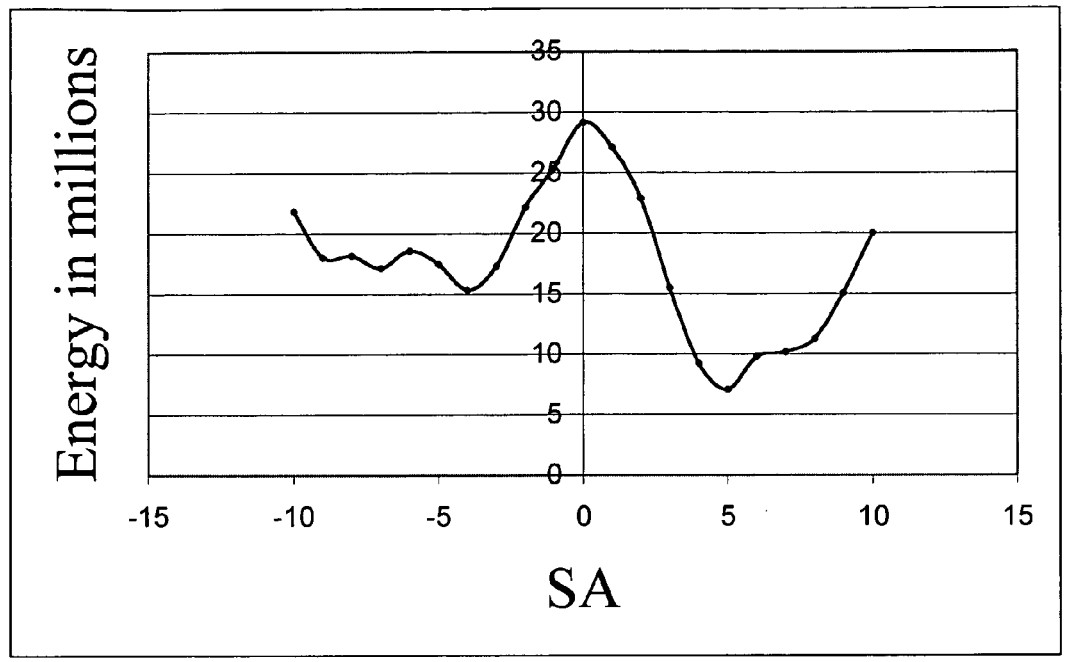
FIG. 7 shows a graph of the relationship between image energy and spherical aberration coefficient according to an energy minimization method of spherical aberration detection.

Referring to FIG. 7, a graph is shown of the relationship between image energy and spherical aberration coefficient when the image of FIG. 4 was deconvolved using a plurality of spherically aberrated PSFs. As can be seen, the minimum energy of the image is obtained when the PSF has a spherical aberration value of approximately 5.05, very near the value of 4.9 obtained using the correlation-based method.

Accordingly, the algorithm below can be used to detect the spherical aberration of an image using the energy minimization method. In determining the nominal value of SA, Brent's one-dimensional search algorithm may be used. See Brent, R. P., ALGORITHMS FOR MINIMIZATION WITHOUT DERIVATIVES (1973).

1. initialize spherical aberration (SA) to $SA_0$;
2. initialize the current minimum energy to a large number;
3. generate a PSF using an SA;
4. deconvolve the image with the generated PSF;
5. measure the energy of the deconvolved image;
6. if the energy in the deconvolved image is less than the current minimum energy, then set the nominal SA equal to SA;
7. pick a new value for SA; and
8. repeat steps 3-7 for all SA values in the search space.

B. Empirical PSF Equation

Another objective of the present invention is the generation of accurate PSF equations. In theory, it is possible to do so mathematically. In practice, however, such formulas, when they can be generated at all, tend to be very complex.

Accordingly, the present invention provides an alternative to the mathematical derivation of PSF equations by providing a method for empirically deriving the equations from the image data themselves. To accomplish this, a new pupil function equation was developed which has proven much more accurate than those described above. The equation is expressed as:

$$F(X, Y) = \begin{cases} e^{\{i(knAz\rho^2 + 2\pi S\rho^4)\}} & \rho^2 \le 1 \\ 0 & \rho^2 > 1 \end{cases} \quad \text{(Eq. 7)}$$

where the additional S factor defines the severity of the spherical aberration, a value typically between -10 and 10.

To empirically derive the PSF equation, a range of hourglass angles is first defined. For example, as shown below in Table 1, angles were chosen between 25 and 70 degrees, in 5 degree increments. Then, using the new pupil function equation (Eq. 7), a value for A is determined that would generate a PSF with a measured hourglass angle equal to each of the angles in the range. These are the "Required A values" in Table 1. Finally, a third-order polynomial is fitted to the data points of Table 1. That polynomial is:

$$A_{empirical} = c_3\alpha^3 + c_2\alpha^2 + C_1\alpha + c_0 \quad \text{(Eq. 8)}$$

where $\alpha$ is the hourglass angle calculated using Equation 3 and $c_3$, $c_2$, $c_1$, and $c_0$ are obtained from the polynomial fitting.

The pupil function of Equation 7, substituting the third-order polynomial of Equation 6 for the factor A, is the empirical PSF equation of the present invention. It is expressed as:

$$F(X, Y) = \begin{cases} e^{\{i(kn(c_3\alpha^3 + c_2\alpha^2 + c_1\alpha + c_0)z\rho^2 + 2\pi S\rho^4)\}} & \rho^2 \le 1 \\ 0 & \rho^2 > 1 \end{cases} \quad \text{(Eq. 9)}$$

TABLE 1

| Angle | 25 | 30 | 35 | 40 | 45 | 50 | 55 | 60 | 65 | 70 |
|---|---|---|---|---|---|---|---|---|---|---|
| Required A value | 0.12 | 0.17 | 0.24 | 0.31 | 0.42 | 0.52 | 0.67 | 0.84 | 1.09 | 1.35 |

Figure 8:
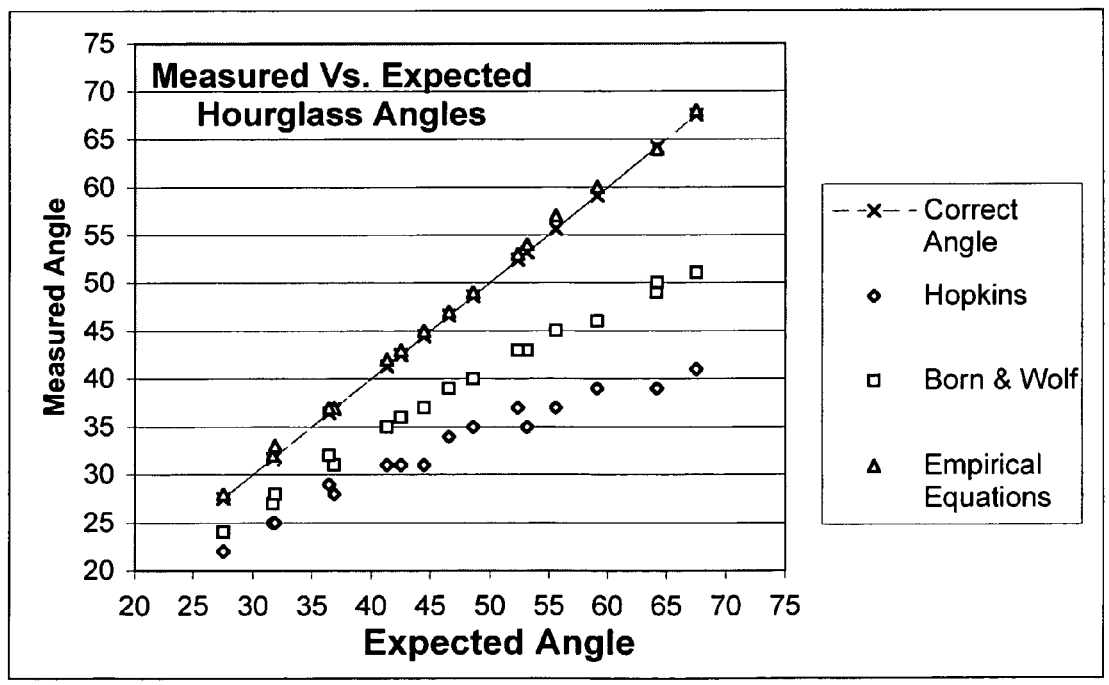
FIG. 8 shows a graph of the measured hourglass angles versus expected hourglass angles using three PSF equations, including the empirical equation of the present invention.

FIG. 8 shows a graph of expected hourglass angles versus measured hourglass angles for a range of measured angles using the empirical equation of the present invention as well as the formulae provided by Hopkins and Born and Wolf. See Hopkins (1955), supra; Born, M. and Wolf E., PRINCIPLES OF OPTICS, 4th ed. (1970). The Hopkins formula is expressed as:

$$A_{Hopkins} = \frac{1}{2}\sin^2\alpha \quad \text{(Eq. 10)}$$

The Born and Wolf formula is expressed as:

$$A_{Born\&Wolf} = 2\sin^2\frac{\alpha}{2} \quad \text{(Eq. 11)}$$

which can similarly be expressed as:

$$A_{Born\&Wolf} = \frac{2}{1+\cos\alpha} \cdot A_{Hopkins} \quad \text{(Eq. 12)}$$

As can easily be seen from FIG. 8, the empirical PSF equation of the present invention much more accurately estimates the correct hourglass angle than do either the Hopkins equation or the Born and Wolf equation, each of which exhibits increasing errors as the hourglass angle increases.

C. Adaptive Sampling Rate

As noted above, one difficulty in using any of the pupil function equations above is that the sampling density established by a user during the acquisition of image data may not satisfy the Nyquist criterion, i.e., $\max(\Delta x, \Delta y) \le (1/(2B_{pupil}))$. When this occurs, the circular pupil function in the frequency domain will not be covered by the frequency range represented by the discrete time Fourier transform. The result is a PSF function having a significantly smaller hourglass angle than it should.

One can increase the sampling density to satisfy the Nyquist criterion by, for example, dividing the actual sampling spacing along each axis by an integer. If, for example, the sampling spacing along each axis was divided by two, the frequency range of the discrete Fourier transform will be increased by a factor of two and is more likely to cover the pupil function. After the PSF is generated, it is downsampled by a factor of two to conform with the original spacing.

There are, however, two significant problems with using such a method. First, it is unknown how large an integer the sampling spacing must be divided by in order to ensure satisfaction of the Nyquist criterion. Underestimating the integer will fail to solve the problem. Overestimating the integer leads to the second problem, namely, redundant oversampling, which unnecessarily increases computational power and memory.

Accordingly, the present invention utilizes an adaptive sampling rate that (1) ensures satisfaction of the Nyquist criterion, (2) contracts the actual sampling density by a small integer in order to avoid interpolation operations during downsampling, and (3) minimizes computational demands.

The minimal sampling density can be calculated using the Nyquist criterion. Therefore, an adaptive sampling rate meeting all three of the requirements above may be found using the following equations of the present invention:

$$\Delta x_{new} = \frac{\Delta x}{int\left(1 + \frac{\max(\Delta x, \Delta y)}{\frac{1}{2B_{pupil}}}\right)} \quad \text{(Eq. 13)}$$

$$\Delta y_{new} = \frac{\Delta y}{int\left(1 + \frac{\max(\Delta x, \Delta y)}{\frac{1}{2B_{pupil}}}\right)} \quad \text{(Eq. 14)}$$

where $\Delta x$ and $\Delta y$ are the actual sampling spacing in the x and y axes and $B_{pupil}$ is the bandwidth of the pupil function in Equation 4.

These two equations permit contraction of the sampling spacing by the smallest integer necessary to guarantee satisfaction of the Nyquist criterion while simultaneously avoiding interpolation during downsizing and minimizing computational demands.

Figure 9:
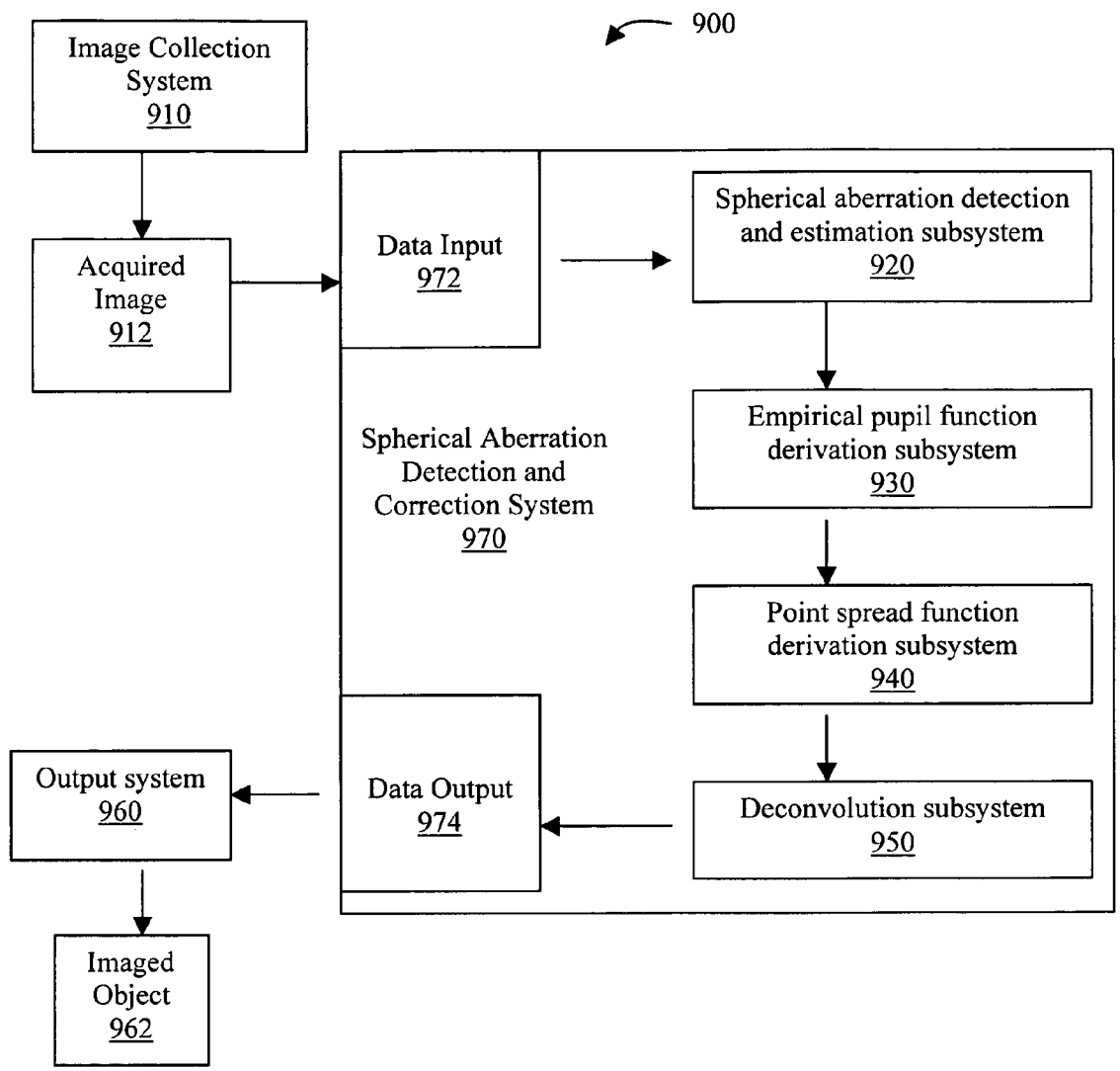
FIG. 9 shows a diagram of a system for the detection and correction of spherical aberration according to the present invention.

Referring to FIG. 9, a diagram is shown depicting a system 900 for recovering a representation of an imaged object 962 from an acquired image 912 according to the present invention. Image collection system 910 gathers image data which comprise acquired image 912. Image collection system 910 may be any system known in the art, including, for example, a light microscope. Data comprising acquired image 912 enters the spherical aberration detection and correction system 970 through data input 972. Spherical aberration detection and correction system 970 is comprised of four subsystems 920, 930, 940, 950. Data is first processed by a spherical aberration detection and estimation subsystem 920. Detection and estimation may include one or both of the correlation-based method and the energy minimization method described herein. Next an empirical pupil function derivation subsystem 930 empirically derives a pupil function using data from subsystem 920. Then, a point spread function derivation subsystem 940 derives a point spread function from the pupil function derived by subsystem 930. Finally, a deconvolution subsystem 950 deconvolves the data using the point spread function derived by subsystem 940. Deconvolution subsystem 950 may utilize any deconvolution algorithm known in the art, including, for example, blind, non-blind, and inverse filter algorithms. Data processed by subsystems 920, 930, 940, and 950 exit system 970 through data output 974. From system 970, data may enter an output system 960 for rendering data processed by system 970 into a useful form, shown as imaged object 962. Imaged object 962 may take any of a number of forms, including, for example, electronic data, a graphical display, and a projected image.

Figure 10:
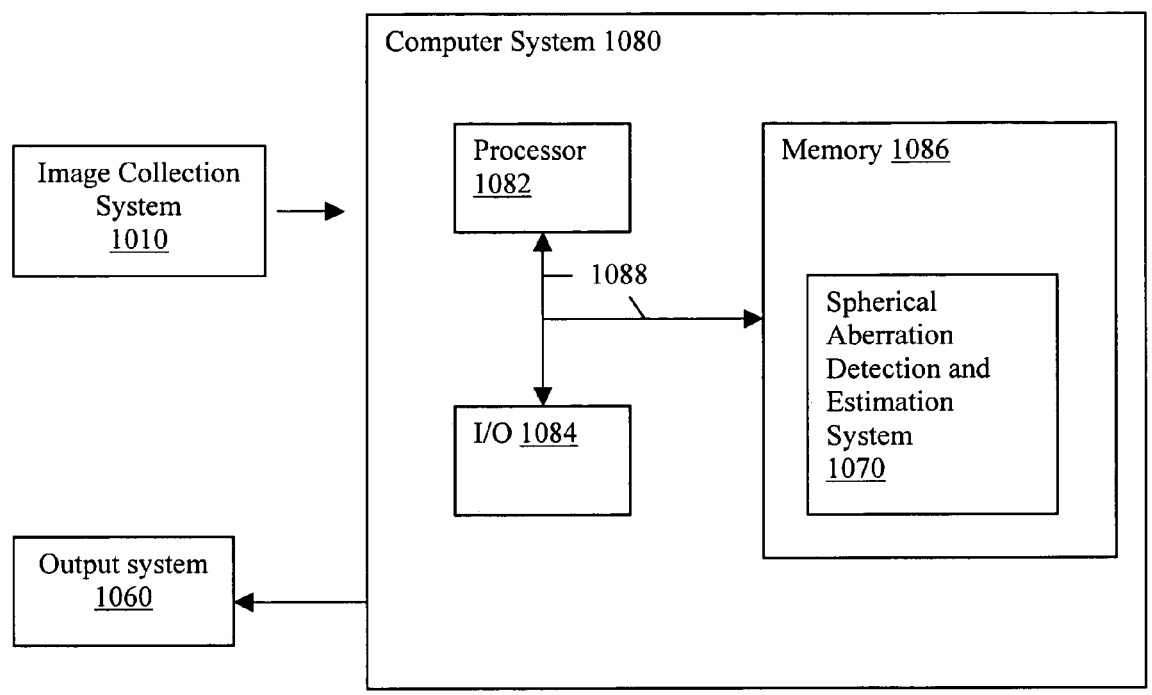
FIG. 10 shows a computer system in which the system of FIG. 9 may be embodied according to the present invention.

The system of FIG. 9 may be embodied, in whole or in part, in a computer system. Referring to FIG. 10, a computer system 1080 is shown, generally comprising a processor 1082, memory 1086, bus 1088, input/output (I/O) interfaces 1084, and external devices or resources, depicted as image collection system 1010 and output system 1060. Processor 1082 may comprise a single processing unit, or be distributed across one or more processing units in one or more locations, e.g., on a client or server. Memory 1086 may comprise any known type of data storage and/or transmission media, including magnetic media, optical media, random access memory (RAM), read-only memory (ROM), a data cache, a data object, etc. Moreover, similar to processor 1082, memory 1086 may reside at a single physical location, comprising one or more types of data storage, or be distributed across a plurality of physical systems in various forms.

I/O interfaces 1084 may comprise any system for exchanging information to and/or from an external source. External devices and/or resources may comprise any known type of external device, including speakers, a CRT, LED screen, hand-held device, keyboard, mouse, voice recognition system, speech output system, printer, monitor or display, facsimile, pager, etc. Bus 1088 provides a communication link between each of the components in computer system 1080 and likewise may comprise any known type of transmission link, including electrical, optical, wireless, etc. Although not shown, additional components, such as cache memory, communication systems, system software, etc., may be incorporated into computer system 1080.

Stored in memory 1086 as a program product is spherical aberration detection and estimation system 1070, which, as described above, processes data collected by image collection system 1010, the processed data ultimately being provided to output system 1060.

Although not shown, computer system 1080 may include, as an integral part or external device, a database. Such a database may include any system (e.g., a relational database, file system, etc.) capable of providing storage for information under the present invention. Such information could be derived directly from computer system 1080, or be derived, created, or stored in any other manner, e.g., as a result of recording historical changes, etc. As such, the database could include one or more storage devices, such as a magnetic disk drive or an optical disk drive. In other embodiments, the database may include data distributed across, for example, a local area network (LAN), wide area network (WAN), or storage area network (SAN).

It should be appreciated that the teachings of the present invention could be offered as a business method on a subscription basis. For example, spherical aberration detection and correction system 1070 could be created, maintained, supported, and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code, or notation, of a set of instructions intended to cause a system having an information processing capability to perform a particular function either directly or after either or both of the following: (a) conversion to another language, code, or notation and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for detecting and estimating spherical aberration in an image obtained using an optical system, comprising the steps of:
    deconvolving an acquired image using each of a plurality of point spread functions, wherein each point spread function has a different spherical aberration value, and wherein the spherical aberration values are chosen from a range between −10 and 10;
    calculating an image energy for each deconvolved image; and
    choosing as a spherical aberration coefficient the spherical aberration value corresponding to the deconvolved image having the lowest image energy,
    wherein a spherical aberration coefficient other than zero indicates the presence of spherical aberration in the acquired image and its difference from zero is an estimation of the degree and direction of spherical aberration.

2. The method of claim 1, wherein the optical system is a microscopy system.

3. The method of claim 1, wherein the point spread function is calculated from a pupil function formula.

4. The method of claim 3, wherein the pupil function formula is $$F(X,Y) = \begin{cases} e^{\{i(knAz\rho^2 + 2\pi S\rho^4)\}} & \rho^2 \leq 1 \\ 0 & \rho^2 > 1 \end{cases},$$

where k is a wave number, n is a refraction index, A is an empirically derived value, z is a distance from an in-focus to an out-of-focus plane, and S is a spherical aberration value.

5. The method of claim 4, wherein the empirically derived value is obtained by fitting a polynomial to data obtained by the steps of:
    defining a range of hourglass angles; and
    calculating a pupil function for each hourglass angle defined, wherein a value for A is obtained that will yield the hourglass angle.

6. The method of claim 5, wherein the empirically derived polynomial is a third order polynomial having the form $$A_{empirical} = c_3\alpha^3 + c_2\alpha^2 + C_1\alpha + c_0,$$

where $\alpha$ is the hourglass angle.

7. A method for detecting and estimating spherical aberration in an image obtained using an optical system, comprising the steps of:
    generating a plurality of spherically aberrated point spread functions for an acquired image, wherein each PSF has a different spherical aberration value;
    calculating an XZ sum-of-intensities projection for each PSF;
    choosing an XZ and a YZ cross section of the image corresponding to a maximum XZ intensity;
    calculating a correlation coefficient using the PSF XZ projection and the XZ and YZ cross-sections for each PSF; and
    choosing as a spherical aberration coefficient the spherical aberration value associated with the PSF corresponding to the highest correlation coefficient,
    wherein a spherical aberration coefficient other than 0 indicates the presence of spherical aberration in the acquired image and its difference from 0 is an estimation of the degree and direction of spherical aberration.

8. The method of claim 7, wherein the optical system is a microscopy system.

9. The method of claim 7, wherein the PSF is calculated from a pupil function formula.

10. The method of claim 9, wherein the pupil function formula is $$F(X,Y) = \begin{cases} e^{\{i(knAz\rho^2 + 2\pi S\rho^4)\}} & \rho^2 \leq 1 \\ 0 & \rho^2 > 1 \end{cases},$$

where k is a wave number, n is a refraction index, A is an empirically derived value, z is a distance from an in-focus to an out-of-focus plane, and S is a spherical aberration value.

11. The method of claim 7, wherein values other than the spherical aberration value are the same in each of the plurality of PSFs.

12. The method of claim 7, wherein the correlation coefficients are calculated using the equation $$C = \frac{\sum_{i=1}^{N}(u_i - \overline{u})(v_i - \overline{v})}{\sqrt{\left(\sum_{i=1}^{N}(u_i - \overline{u})^2\right)\left(\sum_{i=1}^{N}(v_i - \overline{v})^2\right)}},$$

where $u=\{u_i | i=1,2 \ldots N\}$ is the PSF X projection and $v=\{v_i | i=1,2, \ldots N\}$ is one of the XZ data cross-section and the YZ data cross-section.

13. A method for empirically deriving a point spread function comprising the steps of:

defining a range of hourglass angles;

calculating a pupil function for each hourglass angle using the equation $$F(X, Y) = \begin{cases} e^{\{i(knAz\rho^2 + 2\pi S\rho^4)\}} & \rho^2 \leq 1 \\ 0 & \rho^2 > 1 \end{cases},$$

where k is a wave number, n is a refraction index, z is a distance from an in-focus to an out-of-focus plane, S is a spherical aberration value, and A is a value that will yield the hourglass angle;

fitting each value for A to a polynomial equation; and deriving a point spread function from the pupil function.

14. The method of claim 13, wherein the polynomial equation is $$A_{empirical} = c_3\alpha_3 + c_2\alpha^2 + C_1\alpha + c_0,$$

where $\alpha$ is the hourglass angle.

15. A system for detecting and correcting spherical aberration in an image obtained using an optical system, comprising:

a system for detecting and estimating spherical aberration;

a system for empirically deriving a pupil function, wherein the system for empirically deriving a pupil function includes a method comprising the steps of:

defining a range of hourglass angles;

calculating a pupil function for each hourglass angle defined using the equation $$F(X, Y) = \begin{cases} e^{\{i(knAz\rho^2 + 2\pi S\rho^4)\}} & \rho^2 \leq 1 \\ 0 & \rho^2 > 1 \end{cases},$$

where k is a wave number, n is a refraction index, z is a distance from an in-focus to an out-of-focus plane, S is a spherical aberration value, and A is a value that will yield the hourglass angle;

fitting each value for A to a polynomial equation;

substituting the polynomial equation for the A factor in the pupil function equation; and using the substituted pupil function equation to calculate a pupil function;

a system for deriving a point spread function from the pupil function; and a system for deconvolving an imaged object from an acquired image.

16. The system of claim 15, wherein the system for detecting and estimating spherical aberration utilizes at least one of a correlation-based method and an energy minimization method.

17. The system of claim 15, wherein the system for deconvolving an imaged object from an acquired image includes at least one of a blind deconvolution algorithm, a non-blind deconvolution algorithm, and an inverse filter algorithm.

18. The system of claim 15, further comprising a system for inputting acquired image data.

19. The system of claim 15, further comprising a system for outputting processed data.

20. The system of claim 19, wherein the system for outputting processed data includes at least one of a printer, a display apparatus, and an electronic storage apparatus.

* * * * *